(12) United States Patent
O'Boyle et al.

(10) Patent No.: US 6,268,893 B1
(45) Date of Patent: Jul. 31, 2001

(54) METHOD AND APPARATUS FOR A FRINGE DIRECT WRITING SYSTEM

(75) Inventors: Lily O'Boyle, Peekskill; Der-Kuam Kang, Montrose, both of NY (US)

(73) Assignee: American Bank Note Holographics, New York, NY (US)

(*) Notice: Subject to any disclaimer, the term of this patent is extended or adjusted under 35 U.S.C. 154(b) by 0 days.

(21) Appl. No.: 08/815,081

(22) Filed: Mar. 11, 1997

Related U.S. Application Data

(60) Provisional application No. 60/013,155, filed on Mar. 11, 1996.

(51) Int. Cl.$^7$ ............................ G02F 1/133; G02F 1/1335
(52) U.S. Cl. .................................. 349/2; 349/57; 349/64
(58) Field of Search ................................. 349/1, 2, 4, 57, 349/64; 347/239, 255; 359/3, 9, 10, 22, 30, 31, 35, 900

(56) References Cited

U.S. PATENT DOCUMENTS

| | | | |
|---|---|---|---|
| 3,914,761 | * | 10/1975 | Murase et al. . |
| 4,510,575 | | 4/1985 | Mueller et al. ........................ 359/22 |
| 5,049,901 | | 9/1991 | Gelbart ................................. 347/239 |
| 5,229,872 | * | 7/1993 | Mumola .................................. 349/2 |
| 5,521,748 | * | 5/1996 | Sarraf ................................... 349/57 |
| 5,742,362 | * | 4/1998 | Chikamichi ............................. 349/2 |

* cited by examiner

*Primary Examiner*—William L. Sikes
*Assistant Examiner*—Tai V. Duong
(74) *Attorney, Agent, or Firm*—Liniak, Berenato, Longacre & White

(57) ABSTRACT

A structure and method of operation of a fringe direct writing system to produce a hologram or the like. The apparatus is roughly classified into four parts: an illumination part; an image display and optical imaging part; an optically autofocusing part; and a two dimensional moveable stage part. The method of operation directly images a pattern, which is previously calculated by computer and displayed on the LCD panel, onto a recording material. This method affords the possibility to write a fringe pattern in a large region within a short period of time.

2 Claims, 1 Drawing Sheet

METHOD AND APPARATUS FOR A FRINGE DIRECT WRITING SYSTEM

The present invention is directed to a system previously disclosed in U.S. provisional application Ser. No. 60/013,155 filed Mar. 11, 1996 entitled "Security Optical Variable Device Using Direct Fringe Laser Writing" and is incorporated herein by reference.

BACKGROUND OF THE INVENTION

1. Field of the Invention.

The present invention is directed to an efficient and cost effective apparatus and method of generating a high security optical variable device(OVD).

2. Description of the Prior Art.

In the optical process many applications are required to record an interference fringe where a wavefront is to be reconstructed. In general, a fringe pattern is recorded by interfering more than one wavefront beam and recording the fringe onto a high resolution photo-material. However, it is difficult to obtain a fringe pattern which is designed for special applications such as information processing, non-sphere wavefront, etc. For a high security application, it is necessary to record a well-designed pattern so that it is difficult or impossible to counterfeit.

In addition, holography has been a commercially viable product in the security and packaging fields for more than a decade. Landis & Gyr has developed an E-beam written "Kinegram", marketed with its brilliant optical diffractive appearance. CSIRO developed another E-beam OVD called "Pixelgram". Toppan Printing Co. has an E-beam OVD that includes dot-matrix type and 3D grating images. While E-beam generated OVD provides eye catching appearance, it's high cost has become price prohibitive. Very few entities, except government agencies, can afford it. Conventional holographic services have developed much more rapidly, mostly due to the fact that equipment costs are relatively affordable. The present invention was designed to alleviate the drawbacks of the prior art in an effort to provide affordable and high precision diffractive OVD and/or hologram services in a timely manor.

It is an object of the present invention to alleviate the drawbacks of the prior art and to provide an extremely low cost and an effective high speed fringe recording system and method of operating the same.

It is another object of the invention to provide a high speed recording process by using a Liquid Crystal Display (LCD). A computer generated pattern is displayed on the LCD. A collimated laser beam illuminates the LCD and the pattern is imaged onto a photo-material plane with a (X) reduction in size. The pattern displayed on the LCD is shifted in a constant speed. Meanwhile, the photo-material plane is shifted in the same speed so that the pattern can be recorded in extreme high speed.

It is yet an another object of the invention to provide a pattern recording process for the diffractive hologram from a computer generated pattern. A laser beam is focused onto a photo-material plane within a micron order size. The laser beam is switched on and off as to respond to the binary data which is transformed from a computer generated pattern. This recording process offers a very fine pattern forming a diffractive object.

This invention discloses an efficient and cost effective method of generating a high security optical variable device (OVD). Prior art electron beam devises generate a very detailed diffractive grating, but it is extremely costly, slow, and has restrictive ion size. Other conventional holographic systems used to produce various types of 2D and/or 3D images cost less, but have a restrictive performance. This invention provides a method that not only produces optical effect/images that E-Beam systems and conventional holographic systems can, but does it faster and is more cost effective.

SUMMARY OF THE INVENTION

The present invention is directed to a method and apparatus for a fringe direct writing system. The apparatus is roughly classified into four parts: an illumination part; an image display and optical imaging part; an optically auto-focusing part; and a two dimensional (X-Y) moveable stage part.

The illumination part may comprise either a coherent light source or an incoherent light source. The image display and optical imaging part has an LCD device used to display the fringe pattern or the designed pattern which is previously calculated by using a computer combined with an optical imaging setup including an objective lens. The autofocusing part is combined with a semiconductor source and a sensor in order to keep the system on focus between the LCD plane and recording material. The two dimensional moveable stage provides a space to hold a recording material and has a high resolution moving pitch.

Another object that the invention provides is a new method to input the pattern by using an LCD device. Here, the LCD device is used as an optical modulator. In the traditional method, the EB writer focuses a single elector-beam into a spot of sub-micrometer size to write a fringe line by line. In this new method, instead of the single beam, it directly images a pattern, which is previously calculated by computer and displayed on the LCD panel, onto the recording material. This method has the possibility to write a fringe pattern in large region within a short period of time.

For a 3D fringe recording, pre-distorted computer graphics images via Fast Fourier transform (FFT) are calculated to simulate anamorphic optical synthesis systems. The fringe pattern is obtained and distributed into an N by N portion as a matrix pixel and can be down loaded to the LCD panel. A narrow bandwidth illumination source including laser source is used for illumination of the LCD panel. The image displayed on the LCD is imaged on to the recording material. You can synchronize the LCD fringe information, record material location, and expose parameters via precision computer control. The system is capable of combining two tasks. The simple grating which the E-beam system typically accomplishes and the complex imaging that the holographic system typically accomplishes are both achieved by the device according to the present invention. With the combination of the two valuable OVD features, this system offers a significant step forward in the field of security optical variable devices.

DETAILED DESCRIPTION OF THE PREFERRED EMBODIMENTS

Figure 1:
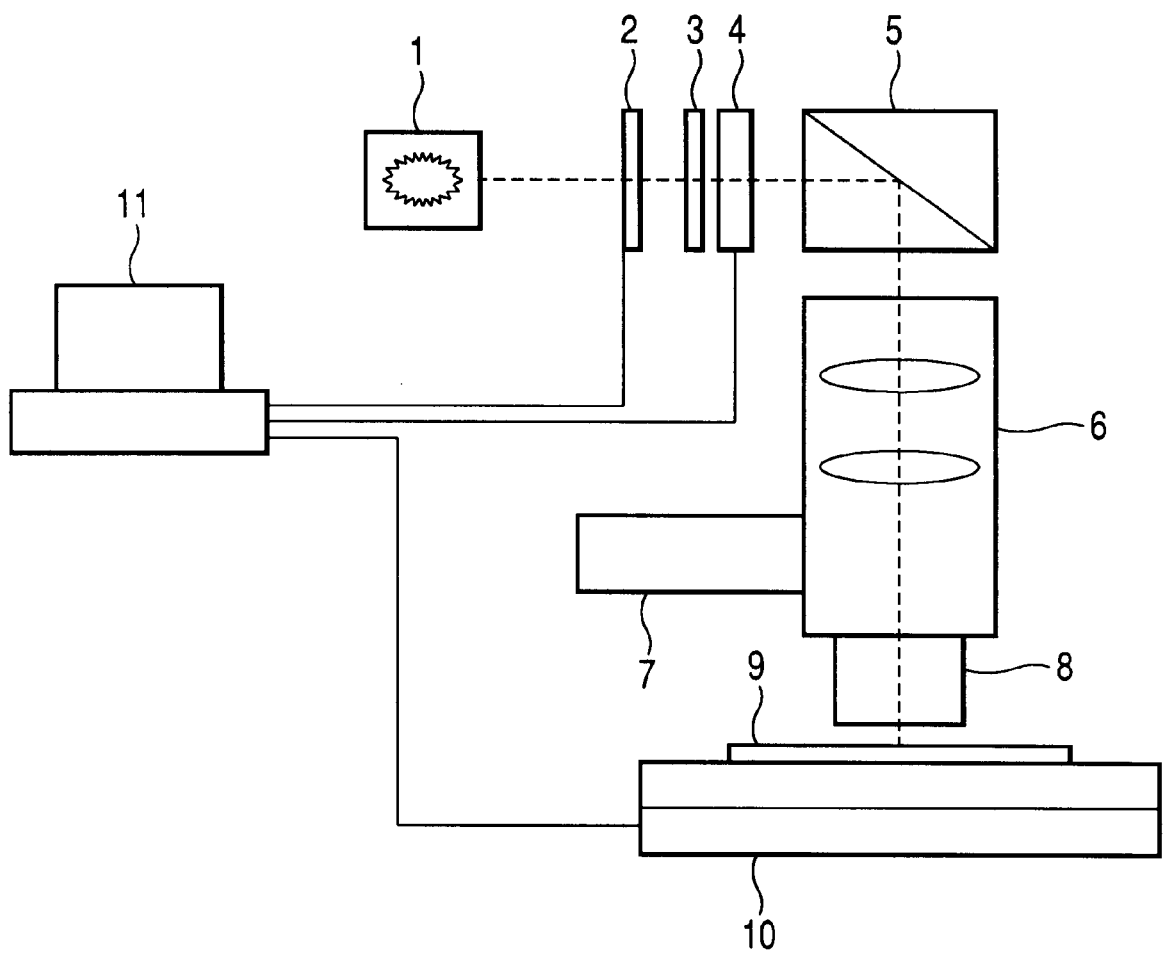
FIG. 1 represents a schematic view of the structure of the OVD according to the present invention.

The present invention is directed to both the structure and method of operation of a fringe direct writing system. The structure of the system will now be described.

Referring to FIG. 1, a laser source (1) is used for illumination on the LCD panel (4). On the LCD panel (4), several square images are displayed. The image can be a fringe or designed pattern which is previously calculated and outputted from a computer (11). An optical brings the fringe pattern image into focus on the photo-material plane (9). In the optical setup, an imaging lens (6) reduces the image size and brings the image into focus through a objective lens (8). The optical setup is built with an autofocus system (7) to maintain the image focused on the photo-material plate (9).

On the focusing plane of the fringe/pattern image a photo-material, for example, a photoresist plate, is set and becomes moveable by driving a two-dimensional (X-Y) moveable stage (10). The photo-material is sensitive to the light such that when exposed to the light, a corresponding pattern is formed on the plate (9).

On the laser beam (1), there is a high speed shutter (2), for example an Acoustic Optical Modulator (AOM) device, for the control of the timing for exposure using a laser beam.

A rotation diffuser (3) is set in front of an aperture, as shown in FIG. 1. This rotation diffuser (3) modulates the coherent light into incoherent light for the purpose of avoiding speckle noise from the laser source. In other words, a narrow band incoherent light source is preferred for this writing system. Thus, the laser is no longer a necessity for recording a computer generated hologram. However, it also can be considered to use a coherent light source when the fringe is designed by writing line by line. In this case, the rotation diffuser (3) and the LCD device do not sit on the optical axis. For this reason, the rotation diffuser (3) and the LCD (4) are well-designed in order to switch between the system mode, the pattern copy mode, and line writing mode.

The method of operation of the direct writing system will now be described. There are two modes of operation to drive the system. One is a pattern copy mode and the other is a fringe writing mode.

For the pattern copy mode, a laser beam or a narrow band incoherent source illuminates a rotation diffuser (3) in order to modulate the coherent light into incoherent source to avoid speckle noise and to obtain a homogeneous illumination distribution on the LCD panel (4). The LCD panel (4) with the previously calculated pattern is displayed. The pattern designed by using a computer will be described in the next section in full detail. After the LCD panel (4), an imaging optical setup is set to focus the pattern image onto the photo-material. The optical setup is built up with an imaging lens (6) and an objective lens (8). In order to keep the focal plane on the photo-material plane, it is necessary to adjust the image optical setup in a short period which is dependent upon the moving speed of the moveable two-dimensional (X-Y) stage (10). In practice, an autofocus system (7), such as that which is usually utilized in microscope equipment, can be considered.

Before exposure, the computer calculates the patterns which should be recorded in one rectangle region, for example, 50 micron*50,000 micron. In the exposure step, the computer output for a square region, for example 50 micron*50 micron, of the pattern on the LCD panel (4), then moves the stage (10) in one direction (here, called Y direction). While the stage maintains a constant moving speed, the AOM shutter opens. At the same time, the computer displays the 50 micron*50000 micron region pattern image continuously so that each pixel of the image will relatively have a static period of time in the photo-material plate. In other words, the static period is the function of the optical intensity and the sensitivity of the photo-material.

After finishing one rectangle region exposure, the light source is shut off and the moveable stage is brought to a stop. The moveable stage (10) is then moved in another direction (here, called X-direction, perpendicular to the Y-direction) a width of the exposed region. The moveable stage (10) is then moved an appropriate distance in the Y direction to the initial position. The second region is exposed as was the first region. This process is repeated until the entire image is produced.

Similar to the aforementioned procedure, the system exposure images a region pattern to continuously expose, without stopping, the photo-material holder stage so the exposure speed is extremely high. In principle, the exposure of a 50 mm square Computer Generated Hologram can be completed within one hour in a general case. This is about 100 times higher in speed comparing with the conventional EB systems.

Handling a system to write a fringe by scanning the beam line by line to make a specified profile of the fringe, the system provides a flexible selection for switching to the fringe writing mode.

In this case, the unit including a rotation diffuser (3) and the LCD panel (4) should be taken off from the system. A laser beam (1) is controlled by a high speed switching device (2), for example an AOM device, filtered through an aperture to reduce the size to a sub micrometer spot on the photo-material. When the stage moves in the Y direction in constant speed, the AOM shutter opens only where the laser spot is on the fringe region. The stage moves just a sub-micrometer pitch in the X direction after scanning a line in the Y-direction. These processes should be repeated until the one square fringe pattern is finished. The spot size D is decided by the N.A. (Numerical Aperture) of the objective lens and wavelength λ as following equation:

$$D=0.82*\lambda/N.A.$$

For example, when the wavelength is 0.000443 mm, the N.A. of the objective lens is 0.8, then the spot size is about 0.45 micron. The possibility of the written frequency of the system is dependent upon the resolution of the X-Y stage and the spot size as mentioned above. In general, the resolution of the X-Y stage can be far higher than the spot size. In this case, the frequency of the pattern will be about 1111 line-pair/mm.

In the preferred embodiment, the aforementioned system and methods to produce a fringe pattern are used to produce a holographic image on the photo-material plate. Once the hologram is formed on the plate, the plate may be copied in the form of a master. The master is then in turn used to mass produce products incorporating the hologram. For example, such holograms may be incorporated into secured documents, credit cards, or other products in an attempt to thwart counterfeiters. Such products manufactured by the aforementioned system and methods are also deemed to be within the scope of the invention.

While the foregoing invention has been shown and described with reference to a preferred embodiment, it will be understood by those possessing skill in the art that various changes and modifications may be made without departing from the spirit and scope of the invention.

We claim:

1. A fringe direct writing system comprising:
    a light source for projecting and transmitting light;
    an LCD display positioned to receive said transmitted light to alter said transmitted light to produce and project an image;

an imaging lens disposed downstream of said LCD display, said imaging lens manipulating said image for further processing:

an objective lens positioned to receive said image from said imaging lens and project a reduced image onto a photo-material plate, whereby said photo-material plate reacts to said image to form a corresponding image thereon;

a moveable stage capable of selectively moving throughout a two dimensional plane, wherein said photo-material plate is disposed on said moveable stage such that said moveable stage is moved to selectively expose a portion of said photo-material plate to said reduced image; and a computer to control an operation of said direct writing system, whereby said computer generates a fringe pattern to be displayed by said LCD display, selectively operates a high speed shutter disposed upstream of said LCD display to control an exposure timing; and selectively controls said moveable stage to facilitate the generation of a predetermined image on said photo-material plate.

2. A fringe direct writing system comprising:

a light source for projecting and transmitting light;

an LCD display positioned to receive said transmitted light to alter said transmitted light to produce and project an image;

an imaging lens disposed downstream of said LCD display, said imaging lens manipulating said image for further processing;

an objective lens positioned to receive said image from said imaging lens and project a reduced image onto a photo-material plate, whereby said photo-material plate reacts to said image to form a corresponding image thereon; and a rotation diffuser disposed between said light source and said LCD display, wherein said light source comprises a laser light source producing coherent light, said rotation diffuser serving to modulate said coherent light into incoherent light to avoid speckle noise.

\* \* \* \* \*